United States Patent [19]

Rosaen

[11] 4,353,337

[45] Oct. 12, 1982

[54] ROTARY ENGINE

[76] Inventor: Oscar E. Rosaen, 51 Roslyn Rd., Grosse Pointe, Mich. 48236

[21] Appl. No.: 146,037

[22] Filed: May 2, 1980

Related U.S. Application Data

[63] Continuation-in-part of Ser. No. 828,299, Aug. 29, 1977, Pat. No. 4,202,313.

[51] Int. Cl.$^3$ ............................................. F02B 53/00
[52] U.S. Cl. ................................... 123/243; 123/202; 123/216; 418/31
[58] Field of Search ....................... 123/243, 202, 216; 418/31, 268, 269, 144

[56] References Cited

U.S. PATENT DOCUMENTS

| | | | |
|---|---|---|---|
| 813,018 | 2/1906 | Okun | 123/243 |
| 917,165 | 4/1909 | Sella | 123/243 X |
| 1,231,769 | 7/1917 | Martin | 418/144 |
| 1,495,526 | 5/1924 | Phillips | 418/269 X |
| 2,174,664 | 10/1939 | Korany | 418/268 |
| 2,510,609 | 6/1950 | Tingle | 418/31 |
| 2,685,255 | 8/1954 | Carner | 418/31 |
| 3,250,260 | 5/1966 | Heydrich | 123/243 X |
| 3,385,514 | 5/1968 | Kilgore et al. | 418/182 X |
| 3,752,605 | 8/1973 | Newton | 318/31 X |
| 3,808,814 | 5/1974 | Macy | 418/31 X |
| 4,018,191 | 4/1977 | Lloyd | 418/31 X |

FOREIGN PATENT DOCUMENTS

| | | | |
|---|---|---|---|
| 1576947 | 5/1970 | Fed. Rep. of Germany | 418/269 |
| 1351278 | 12/1963 | France | 123/243 |
| 558377 | 1/1944 | United Kingdom | 123/243 |
| 120999 | 12/1957 | U.S.S.R. | 418/269 |

Primary Examiner—Michael Koozo
Attorney, Agent, or Firm—Gifford, VanOphem, Sheridan & Sprinkle

[57] ABSTRACT

A rotary internal combustion engine having an elliptical wall member which forms an elliptical internal chamber. A drive shaft is rotatably mounted in the housing and extends transversely through the elliptical chamber. A substantially cylindrical rotor is secured to the drive shaft within the chamber and has a plurality of circumferentially equidistantly spaced vane members radially slidably disposed within the rotor. A source of fluid pressure communicates with the radially inner end of the vane members to urge the vane members radially outwardly so that the vane members contact the elliptical wall. Moreover, each vane member is of a sliding laminated construction to ensure a sealing engagement between the vane member and the wall surface. A fuel and air mixture is supplied to the rotor via an air suction chamber which thereafter is compressed with the fuel between the rotor, the wall portion and adjacent vane members. The fuel/air mixture is ignited by appropriate ignition means to thereby rotatably drive the drive shaft. At at least one rotational position for each combustion cycle two vane members separate the combustion chamber from both the suction and the exhaust chambers to ensure that at least one vane member always separates the combustion chamber from both the suction and exhaust chambers. In addition, a fuel enrichment device utilizes a portion of the compressed fuel/air mixture to selectively augment the fuel supply to the engine.

13 Claims, 4 Drawing Figures

ROTARY ENGINE

CROSS REFERENCE

This application is a continuation-in-part application of Ser. No. 828,299 filed Aug. 29, 1977, entitled ROTARY ENGINE, now U.S. Pat. No. 4,202,313.

BACKGROUND OF THE INVENTION

I. Field of the Invention

The present invention relates generally to internal combustion engines and, more particularly, to such an engine which utilizes a rotor to rotatably drive an engine drive shaft.

II. Description of the Prior Art

There are a plurality of previously known internal combustion engines. Many of these previously known engines, for example conventional gasoline and diesel engines, utilize a plurality of pistons reciprocably disposed in cylinders and secured at one end to a crankshaft.

A still further type of internal combustion engine is a Wankel engine. The Wankel engine, in its most common form, comprises a triangular lobe which rotates both with respect to the drive shaft and with respect to the engine block or housing.

A still further type of internal combustion engine is a rotor driven or rotary engine. This type of engine, which is modelled after a hydraulic motor, comprises a rotor secured to a drive shaft and is rotatable within an elliptical chamber. A plurality of vane members are circumferentially equidistantly spaced around the rotor and are radially slidable within the rotor. The vane members in combination with the elliptical chamber and the rotor form a plurality of separated chambers into which a fuel/air mixture is compressed and ignited to rotatably drive the rotor, and hence the drive shaft.

These previously known rotary engines, however, have not enjoyed widespread commercial success for a number of reasons. One difficulty with these previously known rotary engines is that such engines have been quite inefficient. This disability has thus rendered the rotary engine unacceptable for a wide variety of internal combustion engine applications.

A still further disadvantage of these previously known rotary engines is that due to the relatively large number of engine combustions per revolution of the drive shaft, such engines tend to rapidly overheat. Conventional engine cooling systems have proven inadequate to cool these previously known rotary engines and more efficient and complex cooling systems were deemed impractical due to the prohibitive cost involved.

Also, in previously known rotary engines utilizing vane members to separate the chambers, rather expensive and complicated means have been employed to urge the vanes into sealing contact with the wall defining the combustion chamber.

SUMMARY OF THE PRESENT INVENTION

The engine of the present invention overcomes the above mentioned disadvantages by providing a rotary internal combustion engine which is highly efficient in operation. Further, means are provided to ensure tight sealing engagement between the vanes and the housing throughout the combustion cycle and this, of course, provides for maximum engine efficiency.

In brief, the internal combustion engine of the present invention comprises a housing having an elliptical wall portion which forms an elliptical chamber within the housing. A drive shaft rotatably extends transversely through the elliptical chamber and a rotor is secured to the drive shaft and is contained within the chamber.

A plurality of circumferentially equidistantly spaced vane members are slidably disposed within the rotor and are biased radially outwardly so that the vanes contact the elliptical wall. A fuel/air mixture is communicated to the chamber by appropriate means so that the fuel/air mixture is compressed between the elliptical wall, the rotor, rotating side cover plates and adjacent vane members. Timed ignition means ignite the fuel/air mixture during engine start up to rotatably drive the rotor and hence the drive shaft. After the engine has reached its normal operating temperature, however, the timed ignition means are operatively disconnected and thereafter the engine fuel charge self-combusts, or diesels, due to the heat of compression of the fuel charge.

In the preferred form of the invention, each vane member is of a laminated construction wherein each larger of the vanes can radially displace relative to the other layers. Thus, upon rotation of the rotor, the outer end of each layer of each vane contacts the wall portion to ensure a sealing engagement between the vanes and the wall portion.

The vane members and housing are designed so that for at least one rotational position in each combustion cycle at least two vane members separate the combustion chamber from both the fuel/air inlet chamber and the exhaust chamber. This ensures that at least one vane member always separates the combustion chamber from both the inlet and the exhaust chambers.

The fuel/air mixture is delivered to the suction inlet chamber of the rotary engine by conventional air mixing means, such as a carburetor. In one form of the invention, the compressed air from the engine is used to enhance the air/fuel mixing.

At least one one-way valve connects the chambers defined by the vanes with the underside of the vanes so that the compressed gases are used to bias the vanes radially outwardly and into sealing contact with the housing wall.

BRIEF DESCRIPTION OF THE DRAWINGS

A better understanding of the present invention will be had upon reference to the following detailed description when read in conjunction with the accompanying drawings wherein like reference characters refer to like parts throughout the several views, and in which.

DETAILED DESCRIPTION OF A PREFERRED EMBODIMENT OF THE PRESENT INVENTION

Figures 1, 4:
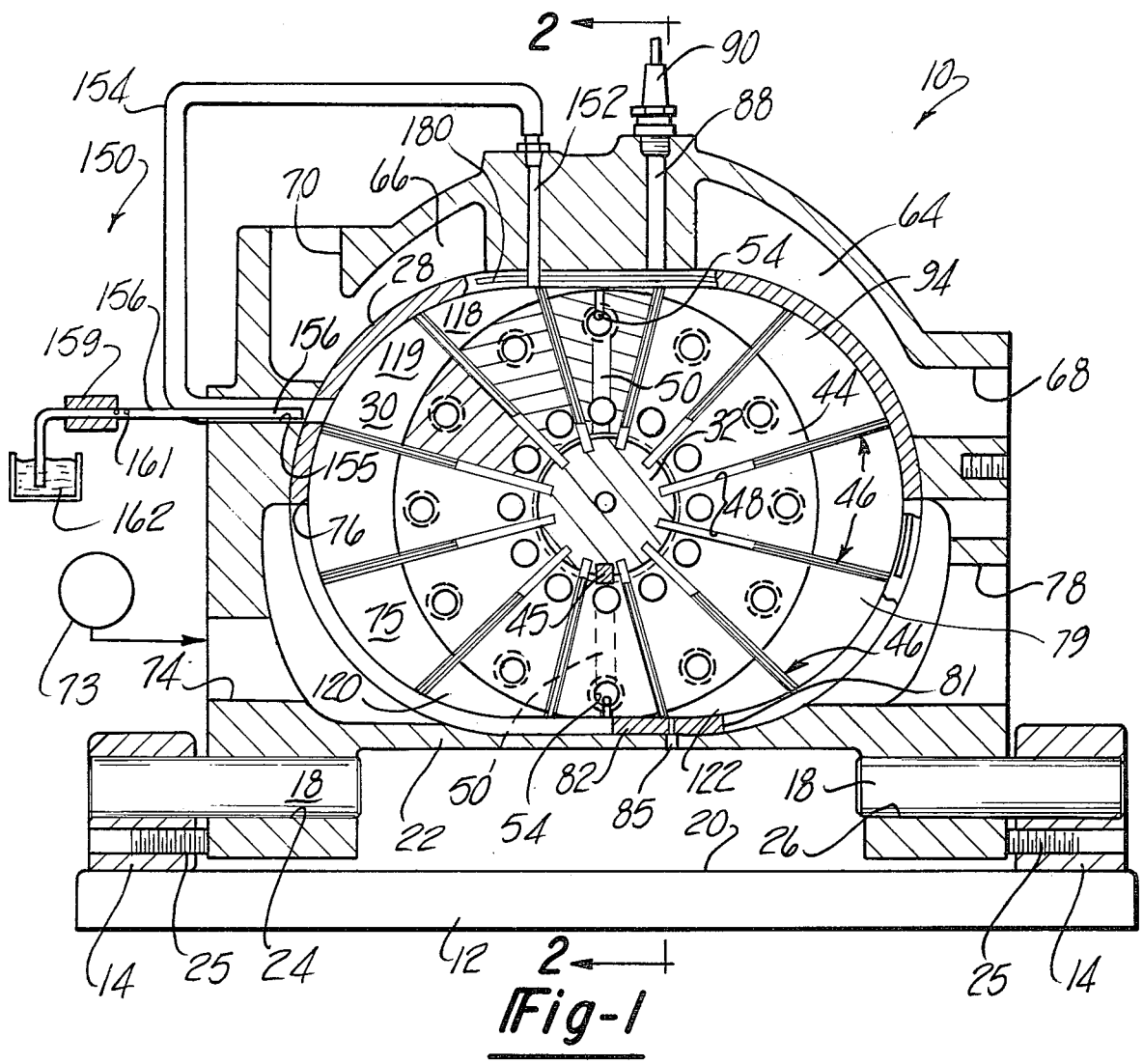
FIG. 1 is an axial cross-sectional view showing the internal combustion engine and compressor of the present invention.
FIG. 4 is a fragmentary sectional view illustrating the contact between the vane and wall and enlarged for clarity.

With reference to FIG. 1 of the drawing, the internal combustion engine 10 of the present invention is there shown and comprises a rigid base 12 having a pair of spaced supports 14 secured to the base 12 by any appropriate means, such as by bolts (not shown). A cylindrical support member 18 is secured to each support 14 so that each support member 18 is generally parallel to the upper surface 20 of the base 12.

Still referring to FIG. 1, the engine 10 further comprises a housing 22 having registering bores 24 and 26 formed in the lower portion of the housing 22. The bores 24 and 26 are substantially the same diameter as each support member 18 and each bore 24 or 26 is adapted to receive one support member 18 therethrough so that the housing 22 is securely mounted to the support member 18 with a lower portion positioned between the supports 14 and adjacent the face 20 of the base 12. Threaded locking members 25 extend through the supports 14 and abut against the housing 22 to prevent longitudinal movement of the housing 22. The locking members 25 also enable the adjustment of the longitudinal position of the housing 22 along the members 18 to thereby vary the compression and decompression ratios of the engine 10. Moreover, the housing 22 can pivot slightly around the cylindrical support members 18 for a reason to be subsequently discussed.

Still referring to FIG. 1, a substantially elliptical wall member 28 is mounted within the housing 22 and forms an elliptical chamber 30 having a generally vertical minor axis and a generally horizontal major axis as viewed in FIG. 1. A drive shaft 32 extends transversely through the center of the elliptical chamber 30 and generally perpendicular to the axes of the support members 18. As can best be seen in FIG. 2, the drive shaft 32 is rotatably carried by bearings 34 and 36 which are in turn rigidly secured to the base 12 by bearing supports 38 and 40, respectively. The supports 38 and 40 are mounted to the base 12 by any suitable means, such as bolts, and extend upwardly from the face 20 of the base 12.

Referring again to FIG. 1, a rotor 44 is contained within the elliptical chamber 30 and is secured to the shaft 32 by any appropriate means, such as by a key 45. The key 45 also permits the rotor 44 to axially slide along the shaft 32 for a reason to be subsequently described. A plurality of vane members 46 are slidably received within radial slots 48 in the rotor 44 and the slots 48 are circumferentially equidistantly spaced around the rotor 44.

Referring now to FIGS. 1 and 4, each vane member is preferably of a laminated construction thus having a plurality of planar sheets 47 which flatly abut against each other. Each sheet is radially movable relative to the axis of the rotor 44 independently of its adjacent sheet for a reason to be subsequently described.

The vane members 46 are biased radially outwardly so that the free edge 49 (FIG. 4) of each sheet 47 contacts and sealingly engages the inner portion of the elliptical wall member 28. A good sealing contact, without excessive force, between the outer edges 49 of the vanes and the wall member 28 throughout the rotation of the rotor 44 is essential to provide a high efficiency rotary engine. Moreover, since the sheets 47 are radially movable relative to each other, the edges 49 of each sheet 47 can contact the wall portion 28 regardless of the rotational position of the rotor 44.

Figure 2:
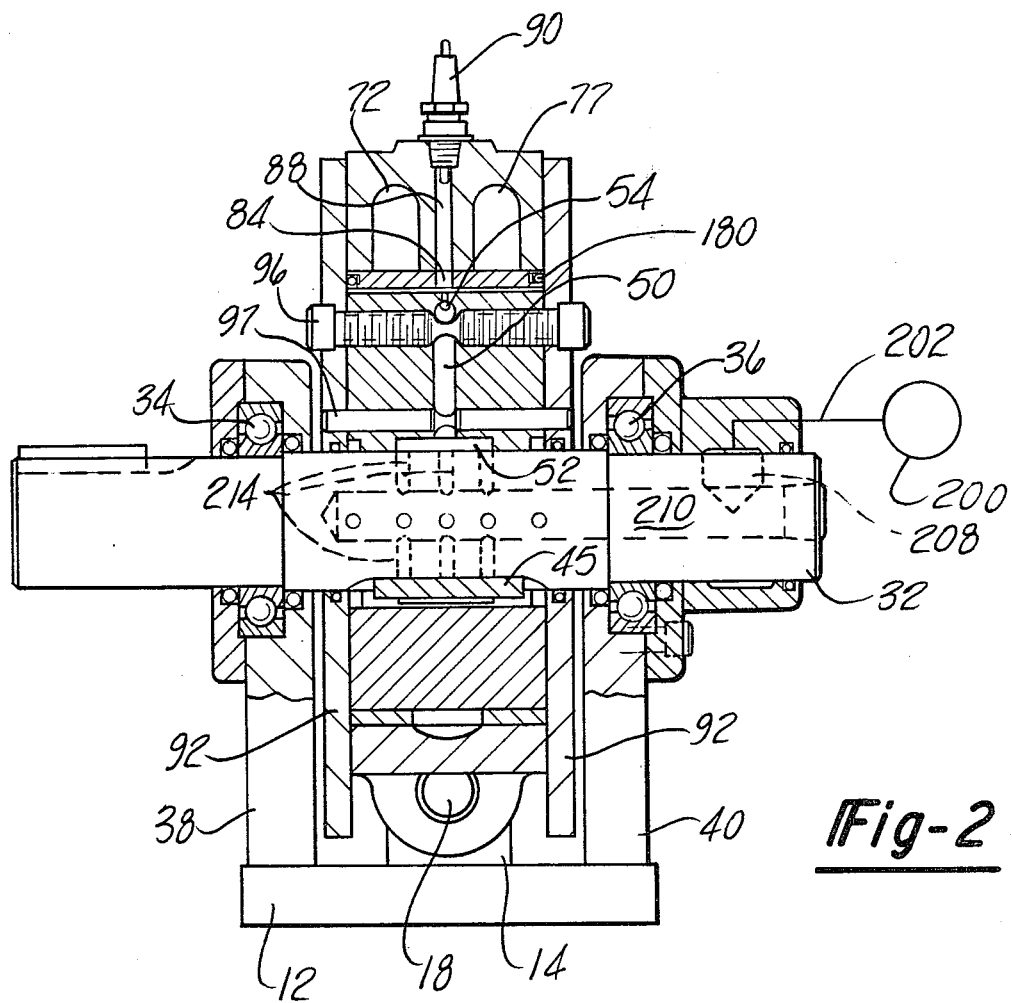
FIG. 2 is a cross-sectional view of the internal combustion engine of the present invention taken substantially along line 2—2 in FIG. 1.

In the present invention, this is accomplished by directing a portion of the compressed gases between adjacent vanes 46 to the area beneath the vanes 46. Referring to FIGS. 1 and 2, at least one port 50 is illustrated opening to an annular recess 52. The recess 52 is in registry with the slots 48 (FIG. 1) beneath the vane members 46 and a one-way valve 54 disposed in the rotor 44 and fluidly between the chambers 30 and the port 50 and the recess 52. Although a pair of diametrically opposed one-way valves 54 are shown in FIG. 1, it should be understood that one or more valves can be used between several vane members 46 while remaining within the scope of the invention.

With reference to FIG. 1, the elliptical wall portion 28 is relatively thin walled and with the housing 22 forms an upper right-hand chamber 64 and an upper left-hand chamber 66 (as viewed in FIG. 1) between the wall portion 28 and the housing 22. A coolant inlet 70 formed in the housing 22 communicates with the chamber 64 while a coolant outlet 68 formed in the housing 22 communicated with the chamber 66. A pair of passageways 72 (FIG. 2) establish fluid communication between the chambers 64 and 66 so that an engine coolant flows into the inlet 70, through the chamber 64 and the passageways 72, into the chamber 66 and out through the coolant outlet 68.

Still referring to FIG. 1, a conventional fuel/air mixing means 73 (illustrated only diagrammatically), such as a carburetor, supplies a fuel/air mixture through an inlet 74 in the housing 22 and to a suction inlet chamber 75 via an opening 76 in the elliptical wall portion 28. The opening 76 extends downwardly approximately from the major axis of the chamber 30 so that the vane members 44 are at their most radially extended position as they pass the opening 76 assuming clockwise rotation as viewed in FIG. 1.

An opening 78 in the wall portion 28 permits the exhaustion of combustion fumes from an exhaust chamber 79. The opening 78 registers with an opening 81 in the wall portion 28 which also extends downwardly approximately from the major axis of the chamber 30.

A further wall portion 82 in the housing 22 separates the outlet chamber 79 from the inlet chamber 75 and, as can be seen from FIG. 1, the wall portion 82 ends substantially on the minor axis of the elliptical wall portion 28. Consequently, the vane members 44 pass over the wall portion 82 so that a minimum of exhaust fumes are recirculated to the inlet chamber 75. A bleed 85 is also formed through the housing 22 and wall member 28 to prevent the compression of gases between the vanes as the vanes move from the exhaust and to the suction chamber 75.

Referring to FIGS. 1 and 2, generally diametrically opposed from the wall portion 82, a cylindrical bore 84 which communicates with the chamber 30 is provided in the wall member 28 which registers with a bore 88 formed in the housing 22. A spark plug 90 is secured to the upper open end of the bore 88. The bore 88 is substantially inbetween the cross passageways 72 (FIG. 2). An appropriate ignition system (not shown) is coupled to the spark plug 90.

With reference to FIG. 1, a fuel enriching means 150 can also be used to supply additional fuel to the inlet chamber 75. The fuel enriching means 150 comprises a bore 152 which is formed through the housing 22 and is open to the chamber 30 counterclockwise from the bore 88 by an amount slightly greater than the distance between two vanes 46 in order to fluidly seal the bore 152 from the combustion gases in the combustion chamber. The bore 152 is connected by a conduit 154 to a passageway 155 formed through the housing and open to the chamber 30 to facilitate flow from the bore 152 through the passageway 155. A venturi tube 156 has one end coaxially positioned in the passageway 155 while the other end of the venturi tube 156 is connected to a fuel supply 162 (illustrated only diagrammatically). A slide 159 over the venturi tube 156 selectively covers apertures 161 through the tube 156. Thus, a fluid flow through the bore 155 inducts fuel from the fuel supply 162 in an amount which depends upon the position of the slide 159.

Referring now to FIG. 2, circular cover plates 92 are secured on opposite axial ends of the rotor 44 by bolt members 96 and pins 97. The cover plates 92 slide along and sealingly engage the housing 22 and elliptical wall portion 28 during rotation of the rotor 44.

Figure 3:
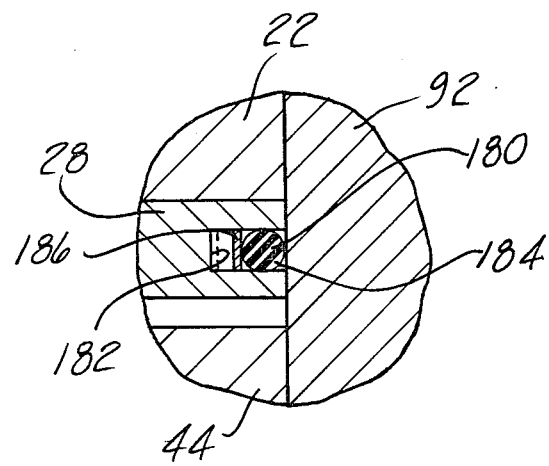
FIG. 3 is a fragmentary sectional view illustrating the engine sealing means and enlarged for clarity.

With reference to FIGS. 1–3, a seal means 180 is provided in a slot 182 to increase the fluid seal between the cover plates 92 and the housing 22. The slot 182 and the seal means extends from before the combustion chamber 94 around the combustion chamber and terminates at the exhaust chamber 79.

The seal means 180 is best shown in FIG. 3 and includes a seal member 184 having a circular cross-sectional shape and preferably constructed of metal. A leaf spring 186 is positioned within the slot 182 between the bottom of the slot 182 and the seal member 184 and urges the seal member 184 outwardly against the cover plates 92.

With reference to FIG. 2, an oil pump 200 is connected by an oil line 202 to an oil fitting (not shown). The oil fitting is connected via a radial port 208 in the drive shaft 32 to an axially extending bore 210 in the drive shaft 32.

Further radial ports 214 through the drive shaft 32 connect the axial bore 210 with the inner ends of the vanes 46 to thereby provide lubrication for the vanes 46 if needed.

The operation of the engine 10 will now be summarized. An air/fuel mixture is provided to the inlet chamber 75 by conventional means 73, such as a carburetor. Rotation of the rotor 44 entraps the air/fuel mixture within an arcuate chamber 118 defined by adjacent vane member 46, the elliptical wall member 28, cover plates 92 and the rotor 44. It will be understood, of course, that there are a plurality of arcuate chambers 118 which successively entrap the air/fuel mixture.

As the rotor 44 (FIG. 1) rotates each arcuate chamber 118 clockwise past the major axis and towards the minor axis of the elliptical chamber 30, the vane members 46 radially move inwardly into the rotor 44. This in turn reduces the volume of the chamber 118 which further compresses the air/fuel mixture within the chamber 118.

In the event that supercharging is desired, a small portion of the compressed fuel/air mixture is bled from the arcuate chamber 118 by the bore 152 and through the conduit 154 and through the bore 155. As this bled portion of the fuel/air mixture passes through the bore 155, it inducts fuel from the fuel supply 162 via the venturi tube 156 which enriches the fuel/air mixture and this enriched mixture is fed to the engine suction chamber 119 and provides an enriched fuel/air mixture for the engine.

As each successive vane member 46 uncovers the bore 84, the compressed air/fuel mixture is ignited by the spark plug 90. The chamber 88 thus forms a precombustion chamber so that the engine 10 is a stratified charge engine.

As is best shown in FIG. 1, the rotor 44 and elliptical wall portion 28 are designed so that for at least one position in each combustion cycle, two vane members 46 separate the combustion chamber from both the first intake chamber 120 and the last arcuate exhaust chamber 122. This construction in turn ensures that at least one vane member 46 will separate the compression chamber 120 from the exhaust chamber 122 despite the rotational position of the rotor. The laminated construction of the vane members 46 (FIG. 3) in which the outer edge 49 of each sheet 47 contacts the wall portion 28 further ensures a good seal between the vane members and the wall portion 28. In this fashion maximum engine efficiency is obtained while minimizing the possibility of engine blowback.

Following the ignition of the air/fuel mixture, the expanding gases from the combustion chamber drivingly rotate the rotor 44 in a clockwise direction toward the major axis of the elliptical chamber 30 until the combustion fumes are exhausted through the opening 78. A further rotation of the rotor 44 moves the rotor 44 past the wall portion 82 such that the wall portion 82 with its air bleed 85 forms an effective barrier between inlet 120 and the exhaust outlet 78.

As has been previously described, coolant flows respectively through the inlet 70, chamber 66, the cross passageways 72, the outlet chamber 64 and out through the coolant outlet 68 and to the appropriate radiator means (not shown). This particular coolant flow is most advantageous since the coolant acts primarily on the wall portion 28 around the combustion chamber 94 where most of the heat is generated. Coolant may alternatively flow into 68 through 64, 72, 66 and out 70.

The valve assembly 54 provides an economical and reliable means of ensuring that sufficient pressure will be present beneath the vane members 46 during all operating conditions. This ensures that the vane member 46 will be fully extended and sealingly abut against the surface of the wall member 28 during operation of the engine. The plurality of vane members 47 reduces the forces at the vane extremities which contact the wall member 28.

Oil can be mixed with the fuel/air mixture as in a two-cycle engine to thereby contribute to lubrication.

A still further mode of operation is possible with the engine according to the present invention in which the engine 10 is a heat combustion, or diesel, engine. In this mode of operation of the engine, the fuel/air mixing means 73 initially supplies a fuel mixture to the engine means 10 which is ignited by the spark plug 90. Moreover, at this time the supercharging means is operatively disconnected from the engine 10.

The air/fuel mixing means 73 further includes means for disconnecting the mixing means 73 from the engine 10 after the engine 10 is heated to a predetermined temperature. Simultaneously, the enriching means is fluidly connected to supply fuel to the engine while the spark plug 90 is operatively disconnected. At this time, however, the engine 10 is sufficiently hot so that the fuel self-combusts, or diesels, from the compression heat of the air/fuel mixture. During this mode of operation, the supercharger, in effect, becomes a fuel injecting means and the primary fuel source for the engine.

Since the housing 22 is pivotally mounted to the cylindrical support members 18 to compensate for misalignment of the drive shaft 32 with respect to the base 12 and also since the rotor 44 is axially slidably mounted to the shaft 32, the housing 22 and rotor 44 are self-centering to permit closer clearances between the housing 22 and cover plates 52 without the risk of engine seizure.

It can, thus, be seen that a rotary engine has been described which is efficient in operation and which is relatively simple to construct and to operate.

Having thus described my invention, many modifications thereto will become apparent to those skilled in the art to which it pertains without deviation from the spirit of the invention as defined by the scope of the appended claims.

I claim:

1. An internal combustion engine comprising:
   a base,
   a housing;
   means for mounting said housing to said base,
   a wall portion in said housing which forms an elliptical chamber;
   a drive shaft and means for rotatably mounting said drive shaft to said base and transversely through said chamber;
   a substantially cylindrical rotor disposed within said chamber and secured to said shaft, said rotor having a plurality of circumferentially equidistantly spaced vane members radially slidably disposed in said rotor;
   means for urging said vane members radially outwardly so that said vane members sealingly engage selected sections of said wall portion whereby said rotor forms a plurality of arcuate chambers between said rotor, said vane members and said wall portion;
   fuel supply means for supplying fuel to said chamber;
   means for exhausting gases from said chamber;
   fuel ignition means for igniting said fuel in one arcuate chamber at a predetermined position on said wall portion wherein at least one rotational position of said rotor, at least two vane members separate said last mentioned arcuate chamber from said fuel supply means and from said exhaust means;
   wherein said housing mounting means further comprises means for slidably mounting said housing to said base along a predetermined linear path of travel, said path of travel being in a radial direction with respect to the axis of said drive shaft, and
   wherein said housing mounting means comprises a pair of cylindrical support members secured to said base, the axes of said support members being parallel to each other and perpendicular to the axis of said drive shaft, and said housing having a pair of parallel and axially spaced bores, said cylindrical support members being slidably and pivotally positioned in said housing spaced bores.

2. The invention as defined in claim 1 wherein said means for urging said vane members radially outwardly comprises means for communicating a source of fluid pressure to the inner radial end of each of said vane members.

3. The invention as defined in claim 1 wherein said fuel supply means supplies fuel to said chamber adjacent the major axis of said chamber and wherein said fuel ignition means ignites the fuel adjacent the minor axis of said chamber.

4. The invention as defined in claim 1 and including a precombustion chamber formed in said housing in a position to communicate with the chamber formed between successive vanes when the fuel charge within said chamber has been compressed.

5. The invention as defined in claim 2 and in which said communicating means comprises an annular chamber connecting with the inner radial end of said vane members and one-way valve means connecting the chamber between successive vane members with said annular chamber.

6. The invention as defined in claim 1 and including means for variably adjusting the position of the housing radially with respect to the axis of the drive shaft.

7. The invention as defined in claim 1 and further comprising a pair of cover plates secured to said rotor.

8. The invention as defined in claim 7 and comprising means for sealing at least one cover plate to said rotor, wherein said sealing means comprises a seal member disposed in a slot around at least a portion of said housing and spring means for urging said seal member into engagement with said cover plate.

9. The invention as defined in claim 1 wherein each vane member further comprises a plurality of planar sheets which flatly abut together, said sheets being radially movable relative to each other.

10. The invention as defined in claim 9 wherein said sheets of each vane member are substantially identical to each other and lie in parallel planes.

11. The invention as defined in claim 1 and comprising means for locking said housing to said base at any adjusted position along said path of travel.

12. The invention as defined in claim 11 wherein said locking means comprises at least one threaded member threadably mounted to said base and having an end which abuts against an abutment surface on said housing.

13. An internal combustion engine comprising:
    a base,
    a housing;
    means for mounting said housing to said base,
    a wall portion in said housing which forms an elliptical chamber;
    a drive shaft and means for rotatably mounting said drive shaft to said base and transversely through said chamber;
    a substantially cylindrical rotor disposed within said chamber and secured to said shaft, said rotor having a plurality of circumferentially equidistantly spaced vane members radially slidably disposed in said rotor;
    means for urging said vane members radially outwardly so that said vane members sealingly engage selected sections of said wall portion whereby said rotor forms a plurality of arcuate chambers between said rotor, said vane members and said wall portion;
    fuel supply means for supplying fuel to said chamber;
    means for exhausting gases from said chamber;
    fuel ignition means for igniting said fuel in one arcuate chamber at a predetermined position on said wall portion wherein at least one rotational position of said rotor, at least two vane members separate said last mentioned arcuate chamber from said fuel supply means and from said exhaust means;
    a pair of cover plates secured to said rotor; and
    wherein said rotor is axially slidably secured to said drive shaft and wherein said housing mounting means comprises means for pivotally mounting said housing to said base.

* * * * *